Patented May 16, 1933

1,909,798

UNITED STATES PATENT OFFICE

BERNARD MARIUS ROBERT ANGLA, OF LYON, FRANCE, ASSIGNOR TO SOCIETE DES USINES CHIMIQUES RHONE-POULENC, OF PARIS, FRANCE

PROCESS FOR THE MANUFACTURE OF SOLUBLE CELLULOSE ESTERS OF HIGHER ORGANIC ACIDS

No Drawing. Application filed February 14, 1930, Serial No. 428,488, and in Great Britain March 11, 1929.

The present invention relates to a process of manufacture of soluble cellulose esters of aliphatic and arylaliphatic monocarboxylic acids containing at least eight carbon atoms in their molecule; these acids will be hereafter referred to under the name of higher acids. The process according to the present invention is particularly applicable to the manufacture of esters of acids from fat bodies, such as oils and fats.

Several processes have been hitherto proposed for the preparation of soluble cellulose esters of such acids as mentioned above. According to some of these processes, these esters are obtained by the action of the chlorides of the corresponding acids on cellulose or hydro-celluloses in presence of solvents or of organic bases (French Patents No. 566,124 and No. 644,480). They can also be obtained in a different manner, by the action of the corresponding acids on cellulose in presence of a catalyst and of an anhydride adapted to enhance the condensation without combining itself with the cellulose (specification of British Letters Patent No. 287,880). When it is attempted to prepare cellulose esters of higher acids by treating cellulose by the anhydrides of the corresponding acids in presence of a catalyst and of a solvent of the ester to be obtained, as is done technically in the manufacture of cellulose acetates, widely variable results are obtained according to the catalyst used; if, for example, sulphuric acid is used, a portion of the cellulose remains undissolved and blackens, while the dissolved portion is entirely degraded; a similar result, although not quite so bad, is obtained with benzene-sulphonic acid. It seems therefore that the esterification of cellulose by the anhydrides of higher acids differs considerably from the esterification of cellulose by acetic anhydride, and that a study of this reaction is necessary if it is desired to utilize it for the preparation of the cellulose esters of these acids.

It has been ascertained that this esterification may be carried out under satisfactory conditions by using as catalysts sulphonic acids derived from aliphatic hydrocarbons.

According to the present invention I manufacture cellulose esters of the higher acids mentioned, and particularly of fatty acids, by causing the anhydrides of these acids to react upon cellulose or its near transformation products in the presence of sulfonic acids derived from aliphatic hydrocarbons with or without diluents.

This process permits one to rapidly obtain a complete esterification of the cellulose and it yields nondegraded products the solutions of which are viscous and free from fibres.

In carrying out the process, it is possible to use as cellulosic raw material, either unchanged cellulose, for example, cotton or wood pulp, which may have been subjected to purification treatments, or modified celluloses; hydrocelluloses, oxycelluloses or hydracelluloses, for example. The esterification may be carried out simply by causing the anhydride of the chosen acid to react upon the cellulosic material in the presence of the catalyst but the operation can also be carried out in presence of diluents; the use of diluents capable of dissolving the cellulosic ester and the acid formed during the reaction by destruction of the anhydride is particularly advantageous, for it permits a homogeneous reacting mass to be obtained. As examples of such diluents one may mention: terachloride of carbon, chloroform, benzene, toluene etc.

According to the present invention, cellulose, or its near transformation products, may be directly subjected to esterification. It is, however, preferable to subject the cellulose fibres before esterification, to a preliminary treatment intended to facilitate the subsequent penetration of the various reagents into the fibre and to caues in this manner the reaction to take place in a more homogeneous medium, conducive to the formation of products of superior quality. The cellulose fibres can, for example, be treated with the melted higher acid to which may be added a portion or the whole of the catalyst used and the diluent; this preliminary treatment is still more efficient if it is carried out in presence of a small quantity of the anhydride used for the esterification. More simply, if the acid the ester of which it is required to prepare possesses a certain volatility, it is sufficient to leave the cellulose fibre for several hours in a heated atmosphere of vapours of this acid.

In the case of acids which are practically non-volatile, as for example the acids extracted from fats, this preliminary treatment may be carried out by means of other compounds which are sufficiently volatile and have a similar action; they are preferably selected among bodies capable of dissolving the water and the anhydride used and which are not capable of combining with cellulose in the conditions obtaining for the reaction; as example of such compounds may be mentioned either the chlorinated esters of polyalcohols and particularly dichlorhydrin, or halogenated organic acids, and particularly chloracetic acids, etc.

The higher esters of cellulose obtained in conformity with the present invention are soluble in a large number of organic solvents and more especially in benzene and the aromatic hydrocarbons. Their solutions give by evaporation transparent homogeneous films of remarkable suppleness. They may be used for the manufacture of plastic materials, of masses similar to celluloid or of varnish, for example. On the other hand, as most of them soften and melt without decomposition at relatively low temperature, they can be used for the manufacture of plastic masses by hot-moulding, without addition of solvents or plasticifying agents.

Several examples, which are by no means limitative, are given below as illustrations of the manner in which the invention is carried out. The parts are by weight.

*Example 1.*—100 parts of cellulose mixed with 25 parts of dichlorhydrin are heated at 90° C. for about 16 hours. After cooling at ordinary temperature the mixture is immersed into an esterifying bath consisting of:

| | Parts |
|---|---|
| Lauric anhydride | 1000 |
| Carbontetrachloride | 900 |
| Methanesulphonic acid | 140 |

After from 3 to 4 hours stirring at ordinary temperature, a viscous, clear and homogeneous solution of cellulose laurate is obtained in the esterifying bath. The cellulose laurate is precipitated with alcohol or with any other suitable agent, it is washed and dried. The product obtained is soluble at ordinary temperature in chloroform, benzene, toluene, carbontetrachloride; it is insoluble in water, ether, alcohol, acetone, acetic acid. Its solutions give by evaporation a transparent film of remarkable suppleness. When subjected to the action of heat it softens at about 90° C. without decomposition.

*Example 2.*—50 parts of cotton are impregnated with 12.5 parts of dichlorhydrin and the mixture is then heated at 90° C. for 16 hours. After cooling 750 parts of palmitic anhydride and 560 parts of carbon tetrachloride are added to the mixture; the whole is maintained at 60° C. for 2 hours, left to cool and allowed to stand for 16 hours at ordinary temperature. It is raised then again to 50° C. and when the cotton is in suspension in the homogeneous liquid medium 50 parts of methane sulphonic acid are added with stirring. After from 3 to 4 hours stirring at this temperature a viscous solution of cellulose palmitate is obtained in the esterifying bath. The cellulosic ester is extracted by precipitation with alcohol or with any other suitable agent, washed and dried. The cellulose palmitate obtained is under the form of an amorphous white powder, soluble in chloroform, benzene, carbon tetrachloride, toluene, a mixture of ligroin with benzene; it is insoluble in water, acetone, acetic acid, cooled or hot ethyl alcohol. Under the action of heat it softens towards 80° C. and it is completely melted at 100° C. without decomposition.

*Example 3.*—A mixture of 100 parts of cellulose and 25 parts of monochloracetic acid is raised to 90° C. for several hours. After cooling down to normal temperature 1400 parts of palmitic anhydride and 1500 parts of carbon tetrachloride are added and the whole is raised to 60° C. and stirred for 2 hours at this temperature so as to obtain a complete impregnation of the cotton by the reagents. 80 parts of methanesulphonic acid are then added. After 4 hours stirring at 55-60° C., a viscous and homogeneous solution of cellulose palmitate is obtained in the esterifying bath. The cellulose ester, after precipitation, washing and drying, presents similar properties to those of the product prepared in Example 2.

*Example 4.*—100 parts of cellulose, preliminarily treated with monochloracetic acid as shown in Example 3, are immersed into a mixture of 1400 parts palmitic anhydride and 1360 parts of carbontetrachloride maintained at 75° C.; the whole is stirred at this temperature for at least 2 hours and allowed to stand at ordinary temperature for 16 hours. It is then raised to 55° C. and, when the cotton is in suspension in the completely melted mass, 160 parts of ethane sulphonic acid are added at one time. After 5 hours stirring at 55° C., a homogeneous solution of the cellulose palmitate is obtained in the esterification bath. The product is precipitated, washed and dried. It presents the same properties as the cellulose palmitate prepared according to Example 2.

*Example 5.*—100 parts of cellulose are mixed with 50 parts monochloracetic acid and the mixture is heated to 80–90° C. for 2 hours. After cooling it is immersed into an esterifying bath maintained at 55–60° C. and consisting of:

| | Parts |
|---|---|
| Palmitic anhydride | 1400 |
| Toluene | 600 |
| Methanesulphonic acid | 100 |

After one and a half hours of stirring at this temperature a viscous and homogeneous solution of cellulose palmitate is obtained in the esterifying bath. The cellulose ester is extracted by precipitation with alcohol, washing and drying. The product so obtained is similar to that which has been prepared according to Example 2.

*Example 6.*—100 parts of cellulose preliminarily treated with monochloracetic acid as indicated in Example 3, are mixed with 1600 parts of stearic anhydride and 1300 parts of carbontetrachloride; the whole is stirred at 70° C. for at least 2 hours, then allowed to cool at ordinary temperature for several hours. It is again raised to 60–65° C. and when the cotton is in suspension in the completely melted esterifying bath, 100 parts of methane sulphonic acid are added. After 1¾ hour stirring at 60–65° C. a viscous and homogeneous solution of cellulose stearate is obtained in the esterifying bath. The cellulose ester is extracted by precipitation with alcohol, washing and drying. The cellulose stearate so prepared is under the form of an amorphous powder soluble in benzene, toluene, chloroform, ligroin, carbontetrachloride; insoluble in water, alcohol, acetone, acetic acid. By evaporating its solutions, homogeneous, transparent and very supple films are obtained. When subjected to the action of heat, the product obtained softens towards 80° C. and completely melts at a higher temperature without decomposition.

*Example 7.*—100 parts of cotton and 25 parts of monochloracetic acid are mixed together and the whole is raised to 90° C. for 16 hours. After cooling 700 parts of phenylacetic anhydride and 1050 parts of cholorform are added; the mixture of the cellulose with these reagents is carried out at 30° C. and the whole is then left at this temperature for at least 2 hours so as to facilitate the penetration of the reagents in the fibre. 120 parts of methane sulphonic acid are then added. After stirring for 17 hours at 17° C. and 6 hours at 30° C. a viscous, limpid, clear and homogeneous solution of cellulose phenylacetate is obtained in the esterifying bath. The cellulose ester is extracted by precipitation with alcohol or with any other suitable agent, washing and drying. The product so prepared is under the form of white scales; it is soluble in benzene, chloroform, a mixture of carbontetrachloride with alcohol; it is insoluble in water, ether, ligroin, methyl alcohol. By evaporating its solutions, films are obtained which have a good transparency. It melts at 130–135° C. without decomposition and may be moulded.

*Example 8.*—100 parts of cellulose, preliminarily treated with monochloracetic acid as indicated in Example 3, are immersed into an esterifying bath consisting of:

| | Parts |
|---|---|
| Toluene | 1000 |
| Palmitic anhydride | 1400 |
| Methanesulphonic acid | 33 |

After about 30 hours' stirring at 60–65° C. a viscous and homogeneous solution of the palmitic ester is obtained in the acylation bath. The product, extracted by the usual means—precipitation, washing and drying—presents properties similar to those of the cellulose palmitate prepared according to Example 3.

*Example 9.*—100 parts of cotton are immersed into a bath composed of 300 parts of technical stearic anhydride, 1300 parts of toluene and 60 parts of methane sulphonic acid and the whole is stirred at 30° C. for about one hour. The esterification is then proceeded with by adding 1000 parts of technical stearic anhydride and 60 parts of methane-sulphonic acid and by stirring at 40° C. for about ½ an hour. In this manner a homogeneous and viscous solution of cellulose stearate is obtained in the esterification bath. The cellulose ester is extracted from it by precipitation, washing and drying. The technical cellulose stearate so prepared is under the form of white granules soluble in benzene, toluene, carbontetrachloride; insoluble in water and alcohol. By evaporation of its collodions a transparent and supple film is obtained. It softens towards 65° C.

What I claim and desire to secure by Letters Patent is:—

1. A process of manufacture of soluble cellulose esters of aliphatic and arylaliphatic monocarboxylic acids, containing at least 8 carbon atoms in their molecule, consisting in treating the cellulose or its near transformation products with the anhydrides of these acids in presence of a low alkyl sulphonic acid as a catalyst.

2. A process as claimed in claim 1, where the catalyst is methane sulphonic acid.

3. Process as claimed in claim 1, in which the reaction is carried out in presence of diluents capable of dissolving the cellulose ester sought, and the carboxylic acid formed during the reaction.

4. Process as claimed in claim 1, in which the cellulose is subjected, before esterification, to a preliminary treatment intended to facilitate the esterification.

5. Process as claimed in claim 1, in which the cellulose is subjected before esterification to a preliminary treatment for facilitating the esterification, said treatment being effected by means of chlorinated esters of polyalcohols.

6. Process as claimed in claim 1, in which the cellulose is subjected before esterification to a preliminary treatment for facilitating the esterification, said treatment being effected by treating the cellulose with melted carboxylic acid to which has been added the catalyst.

7. Process as claimed in claim 1, in which the cellulose is subjected, before esterification, to a preliminary treatment intended to facilitate the esterification, effected by means of monochloracetic acid.

8. A process as claimed in claim 1 in which the cellulose is first treated with monochloracetic acid, then with the diluent and the anhydride used for the esterification and finally with the catalyst.

In testimony whereof I have signed my name to this specification.

BERNARD MARIUS ROBERT ANGLA.